United States Patent
Pfister et al.

(10) Patent No.: US 6,502,419 B2
(45) Date of Patent: Jan. 7, 2003

(54) ELECTRO-DESORPTION COMPRESSOR

(75) Inventors: Dennis M. Pfister, San Luis Obispo; Charles M. Byrd, San Jose; Howard L. Davidson, San Carlos, all of CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/834,080

(22) Filed: Apr. 12, 2001

(65) Prior Publication Data

US 2002/0005046 A1 Jan. 17, 2002

Related U.S. Application Data

(60) Provisional application No. 60/196,819, filed on Apr. 13, 2000.

(51) Int. Cl.[7] .................... F25B 33/00; F25B 15/00
(52) U.S. Cl. .................... 62/497; 62/480; 62/148
(58) Field of Search .................... 62/497, 480, 148, 62/481, 104, 476

(56) References Cited

U.S. PATENT DOCUMENTS

| | | |
|---|---|---|
| 3,995,014 A | 11/1976 | Lewis |
| 4,005,183 A | 1/1977 | Singer |
| 4,032,430 A | 6/1977 | Lewis |
| 4,038,050 A | 7/1977 | Lowther |
| 4,094,652 A | 6/1978 | Lowther |
| 4,251,607 A | 2/1981 | Yamaki et al. |
| 4,300,987 A | 11/1981 | Tseung et al. |
| 4,303,631 A | 12/1981 | Lewis et al. |
| 4,318,825 A | 3/1982 | Frame |
| 4,350,660 A | 9/1982 | Robinson et al. |
| 4,376,747 A | 3/1983 | Nazem |
| 4,442,187 A | 4/1984 | MacDiarmid et al. |
| 4,463,879 A | 8/1984 | Jones |
| 4,480,977 A | 11/1984 | Nazem |

(List continued on next page.)

FOREIGN PATENT DOCUMENTS

| | | |
|---|---|---|
| CN | 1237482 | 12/1999 |
| DE | 39 41 279 | 6/1990 |
| DE | 39 30 145 | 3/1991 |
| DE | 40 30 211 | 3/1992 |

(List continued on next page.)

OTHER PUBLICATIONS

Wegeng, et al., "Process Intensification Through Miniaturization of Chemical and Thermal Systems in the 21st Century", Pacific Northwest National Laboratory publication.

Brooks, et al., "Mesoscale Combustor/Evaporator Development", Battelle publication 1999.

(List continued on next page.)

Primary Examiner—Denise L. Esquivel
Assistant Examiner—Chen-Wen Jiang
(74) Attorney, Agent, or Firm—Henry C. Query, Jr.

(57) ABSTRACT

A electro-desorption compression system according to the present invention comprises an enclosure which includes first and second spaced-apart electrical conductors, a sorbent which is positioned in the enclosure between the first and second conductors, a sorbate which is capable of combining with the sorbent in an adsorption reaction to form a sorbate/sorbent compound, a power supply which is connected to the first and second conductors and which generates an electrical current that is conducted through the sorbate/sorbent compound to desorb the sorbate from the sorbent in a desorption reaction, and a pressure chamber which is connected to the enclosure and which receives the sorbate from the enclosure during the desorption reaction and releases the sorbate into the enclosure during the adsorption reaction. The adsorption and desorption reactions are repeated to cycle the sorbate between a relatively low pressure state during the adsorption reaction and a relatively high pressure state during the desorption reaction. Furthermore, the desorption reaction is substantially non-thermal.

35 Claims, 6 Drawing Sheets

U.S. PATENT DOCUMENTS

| | | | |
|---|---|---|---|
| 4,581,049 A | * | 4/1986 | Januschkowetz .......... 62/480 X |
| 4,593,534 A | | 6/1986 | Bloomfield |
| 4,610,148 A | | 9/1986 | Shelton |
| 4,634,641 A | | 1/1987 | Nozik |
| 4,654,053 A | | 3/1987 | Sievers et al. |
| 4,671,080 A | | 6/1987 | Gross |
| 4,686,096 A | | 8/1987 | Schulz et al. |
| 4,729,820 A | | 3/1988 | Mitchell |
| 4,774,129 A | | 9/1988 | Komiyama |
| 4,801,512 A | | 1/1989 | MacDiarmid et al. |
| 4,818,448 A | | 4/1989 | Wrenn, Jr. et al. |
| 4,831,829 A | | 5/1989 | Jones et al. |
| 4,835,973 A | | 6/1989 | Jones et al. |
| 4,861,575 A | | 8/1989 | Levan |
| 4,875,346 A | | 10/1989 | Jones et al. |
| 4,916,907 A | | 4/1990 | Munk et al. |
| 5,024,060 A | | 6/1991 | Trusch |
| 5,046,319 A | | 9/1991 | Jones |
| 5,063,747 A | | 11/1991 | Jones et al. |
| 5,138,047 A | | 8/1992 | Bornengo et al. |
| 5,157,938 A | | 10/1992 | Bard et al. |
| 5,160,982 A | | 11/1992 | Goronkin et al. |
| 5,289,013 A | | 2/1994 | Goronkin |
| 5,300,272 A | | 4/1994 | Simandl et al. |
| 5,324,976 A | | 6/1994 | Williams |
| 5,347,815 A | | 9/1994 | Jones |
| 5,352,904 A | | 10/1994 | Wen et al. |
| 5,386,705 A | | 2/1995 | Jones |
| 5,416,170 A | | 5/1995 | Rhee et al. |
| 5,418,063 A | | 5/1995 | Booth |
| 5,424,054 A | | 6/1995 | Bethune et al. |
| 5,470,680 A | | 11/1995 | Loutfy et al. |
| 5,477,060 A | | 12/1995 | Choi |
| 5,567,284 A | | 10/1996 | Bauer et al. |
| 5,604,037 A | | 2/1997 | Ting et al. |
| 5,611,211 A | | 3/1997 | Whipple, III |
| 5,687,576 A | | 11/1997 | Moriguchi et al. |
| 5,705,008 A | | 1/1998 | Hecht |
| 5,813,248 A | | 9/1998 | Zornes et al. |
| 5,827,355 A | | 10/1998 | Wilson et al. |
| 5,834,828 A | | 11/1998 | Horn et al. |
| 5,842,356 A | * | 12/1998 | Pfister et al. ................. 62/480 |
| 5,855,121 A | | 1/1999 | Byrd et al. |
| 5,868,974 A | | 2/1999 | Kearns |
| 5,882,623 A | | 3/1999 | Zaluska et al. |
| 5,900,031 A | | 5/1999 | Bloomfield |
| 5,904,832 A | | 5/1999 | Clifford et al. |
| 5,912,424 A | | 6/1999 | Judkins et al. |
| 5,925,168 A | | 7/1999 | Judkins et al. |
| 5,961,814 A | | 10/1999 | Kearns |
| 5,972,077 A | | 10/1999 | Judkins et al. |
| 6,030,698 A | | 2/2000 | Burchell et al. |
| 6,033,506 A | | 3/2000 | Klett |
| 6,036,934 A | | 3/2000 | Hung |
| 6,040,077 A | | 3/2000 | Debe et al. |
| 6,040,266 A | | 3/2000 | Fay, III et al. |
| 6,068,673 A | | 5/2000 | Bloomfield |
| 6,074,453 A | | 6/2000 | Anderson et al. |
| 6,090,477 A | | 7/2000 | Burchell et al. |
| 6,093,504 A | | 7/2000 | Bliesner |
| 6,107,243 A | | 8/2000 | Inagaki et al. |
| 6,109,095 A | | 8/2000 | Addiego |
| 6,113,673 A | | 9/2000 | Loutfy et al. |
| 6,114,620 A | | 9/2000 | Zuppero et al. |
| 6,118,650 A | | 9/2000 | Maeda et al. |
| 6,276,159 B1 | * | 8/2001 | Pfister et al. ................. 62/331 |
| 2001/0000889 A1 | | 5/2001 | Yadav et al. |

FOREIGN PATENT DOCUMENTS

| | | |
|---|---|---|
| DE | 42 20 411 | 12/1993 |
| DE | 44 42 396 | 5/1996 |
| EP | 0 300 330 | 1/1989 |
| EP | 0 839 811 | 5/1998 |
| EP | 0 872 278 | 10/1998 |
| EP | 0 951 084 | 10/1999 |
| EP | 1 013 721 | 6/2000 |
| FR | 2 666 141 | 2/1992 |
| GB | 2 059 141 | 4/1981 |
| JP | 11-79725 | 3/1999 |
| JP | 2002/0066368 A1 | 6/2002 |
| WO | WO 91/06691 | 5/1991 |
| WO | WO 93/19215 | 9/1993 |
| WO | WO 95/03907 | 2/1995 |
| WO | WO 95/15215 | 6/1995 |
| WO | WO 98/13887 | 4/1998 |
| WO | WO 98/40922 | 9/1998 |
| WO | WO 99/05746 | 2/1999 |
| WO | WO 99/66572 | 12/1999 |
| WO | WO 00/02090 | 1/2000 |
| WO | WO 00/07930 | 2/2000 |
| WO | WO 00/25380 | 5/2000 |
| WO | WO 00/26656 | 5/2000 |
| WO | WO 00/30283 | 5/2000 |
| WO | WO 00/32338 | 6/2000 |
| WO | WO 00/35828 | 6/2000 |
| WO | WO 00/40508 | 7/2000 |

OTHER PUBLICATIONS

Drost, et al., "MicroHeater", Pacific Northwest National Laboratory publication (date unknown).

"Neat Fibers" (author unknown), ORNL website (Apr. 1996).

Strizak, et al., "Carbon Fiber Composite Molecular Sieve and Electrical Swing Adsorption Technology Development for the Separation and Capture of Carbon Dioxide" (date unknown).

Judkins, et al., "A Novel Gas Separation Material and Process", ORNL website (May 4, 1998).

Pons, et al., "Characteristic Parameters of Adsorptive Refrigeration Cycles with Thermal Regeneration", Applied Thermal Engineering, vol. 17, pp. 289–298 (Apr. 3, 1996).

Meunier, "Solid Sorption Heat Powered Cycles for Cooling and Heat Pumping Applications", Applied Thermal Engineering, vol. 18, pp. 715–729 (Dec. 10, 1997).

Brenchlley, et al., "Status of Microchemical Systems Development in the United States of America", Pacific Northwest National Laboratory publication (date unknown).

Brenchlley, et al., "Development of Micro–Chemical and Thermal Systems", Pacific Northwest National Laboratory publication (date unknown).

Drost, et al., "Miniature Heat Pumps for Portable and Distributed Space Conditioning Applications", Pacific Northwest National Laboratory publication (date unknown).

Drost, et al., "Mesoscopic Heat–Actuated Heat Pump Development", Battelle publication (date unknown).

Stan et al., "Hydrogen Adsorption in Nanotubes", Pennsylvania State University Department of Physics publication (date unknown).

Stan et al., "Low Coverage Adsorption in Cylindrical Pores", Pennsylvania State University Department of Physics publication (Jan. 22, 1999).

Gou, et al., "Forced Convection in a Channel Filled with High Thermal Conductivity Carbon Foams", Florida International University publication (date unknown).

Klett et al., "Slurry Molding of Carbon–Carbon Composites and their Applications", Oak Ridge National Laboratory publication (date unknown).

Klett, "High Thermal Conductivity Graphite Foam", Oak Ridge National Laboratory publication (date unknown).

Tee, et al., "Thermal Conductivity of Porous Carbon Foam", University of Tennessee publication (date unknown).

Klett, et al., "Foam Core Sandwich Panels Made From High Thermal Conductivity Mesophase Pitch–Based Carbon Foam", Oak Ridge National Laboratory publication (date unknown).

Klett, et al., "Heat Exchangers Based on High Thermal Conductivity Graphite Foam", Oak Ridge National Laboratory publication (date unknown).

Klett, et al., "Graphitic Foam Thermal Management Materials for Electronic Packaging", Society of Automotive Engineers publication (2000).

Klett, "High Thermal Conductivity Mesophase Pitch–Derived Graphfic Foams", Oak Ridge National Laboratory publication (date unknown).

Groszek, "Heats of Adsorption and Desorption of CO2, CH4, SO2, O2 and N2 on Microporous Carbons", Carbon, vol. 35, pp. 1399–1405 (1997).

Klett, et al., "High–Thermal–Conductivity, Mesophase–Pitch–Derived Carbon Foams: Effect of Precursor on Structure and Properties", Oak Ridge National Laboratory publication (date unknown).

Klett, et al., "High Thermal Conductivity Mesophase Pitch–Derived Carbon Foams: Effect of Precursor on Structure and Properties", Oak Ridge National Laboratory publication (date unknown).

Choi, et al., "The Effect of Coupling Agent on Electrical and Mechanical Properties of Carbon Fiber/Phenolic Resin Composites", Polymer, vol. 41, pp. 3243–3252 (2000).

Wang, et al., "Electromechanical Behavior of Carbon Fiber", publication unknown (1997).

MacDonald, et al., "Carbon Adsorbents for Natural Gas Storage", Fuel, vol. 72, pp. 61–64 (1998).

Riffat, et al., "Natural Refrigerants for Refrigeration and Air–Conditioning Systems", Applied Thermal Engineering, vol. 17, pp. 33–42 (1997).

Burchell, et al., "A Novel Carbon Fiber Based Porous Carbon Monolith", publication unknown (date unknown).

Lu, et al., "Mesoporous Activated Carbon Filaments", Carbon, vol. 35, pp. 427–436 (1997).

Shui, et al., "High–Strength High–Surface–Area Porous Carbon Made From Submicron–Diameter Carbon Filaments", publication unknown (1996).

Klett, et al., "Carbon Fiber Carbon Composites for Catalyst Supports", Oak Ridge National Laboratory publication (date unknown).

Roh, et al., "Unique Charge/Discharge Properties of Carbon Materials with Different Structures", Journal of Power Sources, vol. 68, pp. 271–276 (1997).

"Thermal Management Substrates" (author unknown), ORNL website (Apr. 14, 1997).

Gadkaree, "Carbon Honeycomb Structures for Adsorption Applications", Carbon, vol. 36, pp. 981–989 (1998).

Cho, "The Effect of Presorbed Water on the Adsorption of CFC–113 by a Carbon Adsorbent", Carbon, vol. 33, pp. 1091–1095 (1995).

Edie, "The Effect of Processing on the Structure and Properties of Carbon Fibers", Carbon, vol. 36, pp. 345–362 (1998).

Che, et al., "Thermal Conductivity of Carbon Nanotubes", Foresight Institute website (Nov. 8, 1999).

Klett, et al., Thermal Management Solutions Utilizing High Thermal Conductivity Graphite Foams, Oak Ridge National Laboratory publication (date unknown).

* cited by examiner

FIG. 9
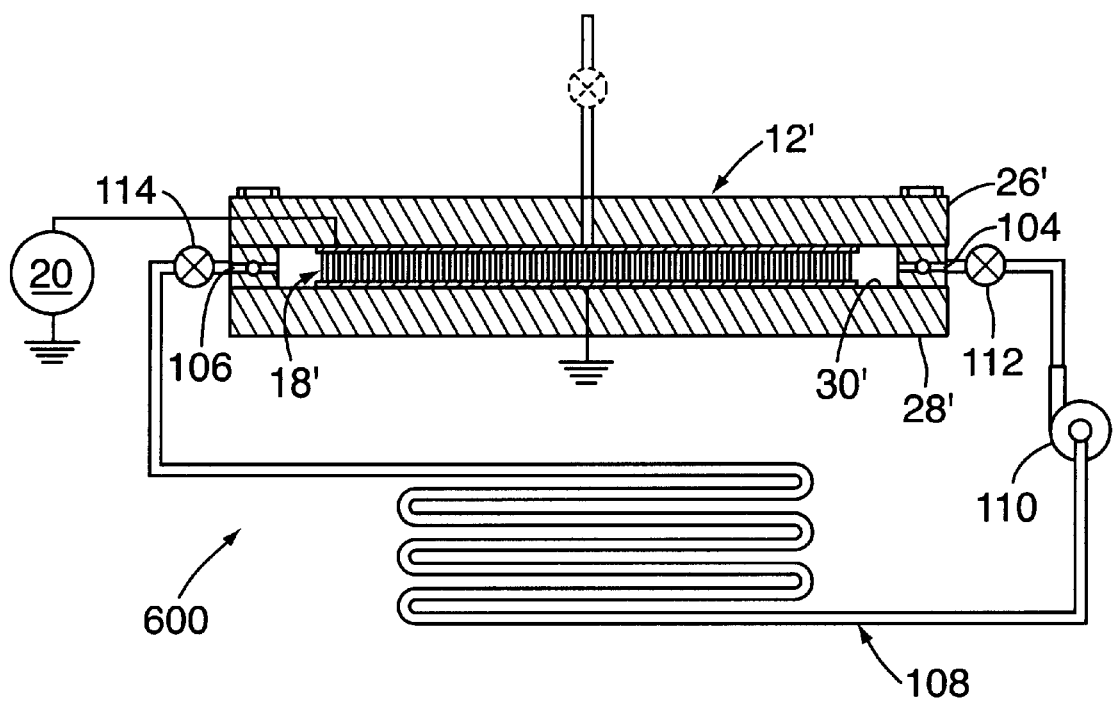
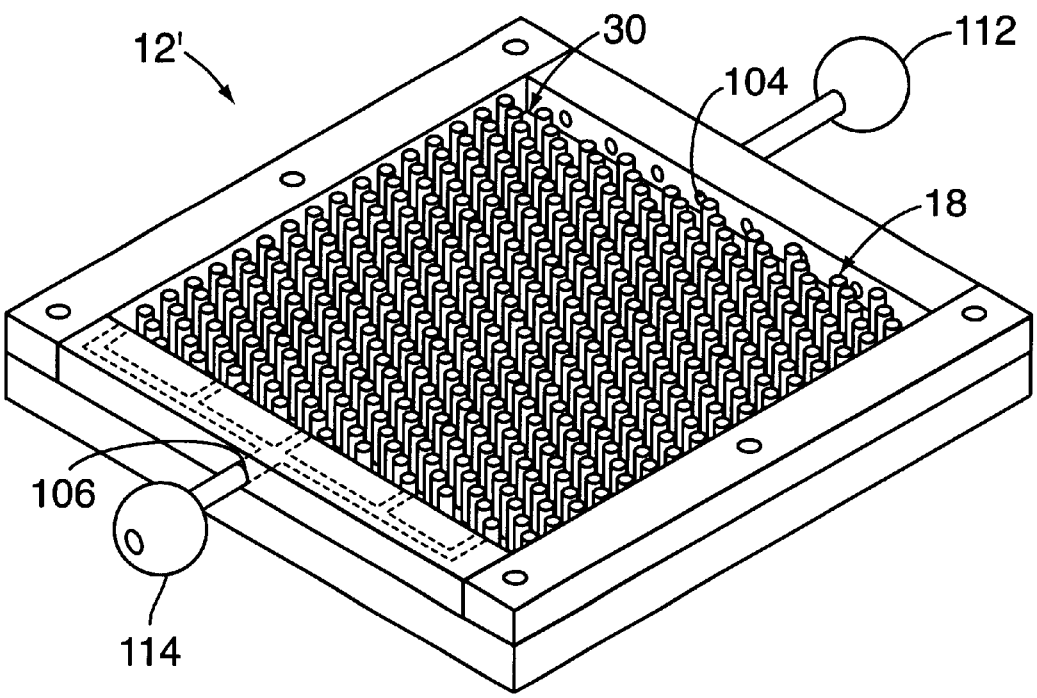
FIG. 10

ELECTRO-DESORPTION COMPRESSOR

This application is based on United States Provisional Patent Application No. 60/196,819, which was filed on Apr. 13, 2000.

BACKGROUND OF THE INVENTION

The present invention relates to a closed-cycle adsorption system wherein a sorbate is alternately adsorbed onto and desorbed from a sorbent in order to cycle the sorbate between a low pressure state and a high pressure state. More particularly, the invention relates to a closed-cycle adsorption system which employs electrical energy to desorb the sorbate from the sorbent in a substantially non-thermal reaction.

In existing adsorption and absorption compression systems, which will be referred to herein simply as sorption compression systems, a first, typically gaseous substance called a sorbate is alternately adsorbed (or absorbed) onto and desorbed from a second, typically solid substance called a sorbent. Particular sorption compression systems utilize specific sorbates and sorbents to produce a desired effect which is dependent on the affinity of the two substances. During the adsorption reaction, the relatively low pressure sorbate is drawn onto and combines with the sorbent to produce a sorbate/sorbent compound. During the desorption reaction, energy is supplied to the sorbate/sorbent compound to break the bonds between the sorbate and sorbent molecules and thereby desorb the sorbate from the sorbent. In this reaction, the sorbate molecules are driven off of the sorbent molecules and into a relatively high pressure, high energy gaseous state. Substantial energy is imparted to the sorbate during the desorption reaction, and this energy can be harnessed for various uses.

A common use of sorption compression systems is in the field of refrigeration. An exemplary sorption compression refrigerator may use a polar refrigerant as the sorbate and a metal halide salt as the sorbent. During the desorption reaction, which occurs in an enclosure called a sorber, the refrigerant molecules are driven off of the salt and into a relatively high pressure gaseous state. The refrigerant gas is subsequently condensed and then evaporated to produce a cooling effect. The evaporated refrigerant gas is then channeled back to the sorber, where it is once again adsorbed onto the salt in an adsorption reaction. The sorption cycle is repeated numerous times depending on the cooling requirements of the refrigeration system.

Though sorption compression systems offer certain advantages over mechanical compressors, their efficiency is generally limited by the characteristics of the desorption and adsorption reactions. For example, prior art heat-activated sorption compression systems require a great deal of thermal energy to stochastically heat the sorbate/sorbent compound to a degree sufficient to break the bonds between the sorbate and sorbent molecules. This thermal energy is commonly supplied by a gas or electric heater whose heat is conducted to the sorbate/sorbent compound through a typically metal sorber. As a result, a substantial amount of sensible heat is added to the sorbate, the sorbent and the sorber during the desorption reaction. However, since the sorbent must usually be relatively cool to adsorb the sorbate molecules, a significant amount of time and/or ancillary cooling means are required to remove this sensible heat and cool the sorber and the sorbent before the next sorption reaction can proceed, and these necessarily reduce the efficiency of the system.

Certain prior art sorption compression systems have been developed to address the problems associated with heat-activated sorption compression systems. For example, the sorption compression refrigeration system described in U.S. Pat. No. 5,842,356, which is commonly owned herewith, uses electromagnetic energy to drive the desorption reaction. The desorption energy is supplied in the form of electromagnetic waves, such as radio frequency waves or microwaves, which are generated by, for example, a magnetron. Instead of heating the sorbate/sorbent compound, the electromagnetic waves selectively pump electrical energy into each sorbate-sorbent bond until the bond is broken and the sorbate molecule is separated from the sorbent molecule. Therefore, the sorbate, sorbent and sorber are not heated during the desorption reaction, and the overall efficiency of the refrigeration system is consequently greatly improved.

However, the efficiency of electromagnetic energy-activated sorption compression systems is nevertheless limited by the types of sorbents which must be used in such system's. These sorption systems must usually employ a sorbent which has a low loss tangent so as not to be heated by the electromagnetic energy during the desorption reaction. Furthermore, in all sorption systems, including electromagnetic energy-activated sorption systems, the kinetic energy of the sorbate molecules is converted to heat as the sorbate molecules combine with the sorbent molecules during the adsorption reaction. This heat, which is often referred to as the heat of adsorption, must be dissipated prior to the next adsorption reaction so that the sorbent can re-adsorb the sorbate. However, since sorbents with low loss tangents tend to be poor thermal conductors, either sufficient time or external cooling means must be provided to cool the sorbent prior to the next adsorption reaction.

In light of the foregoing, a need exists for a sorption compression system which has a simplified structure and a relatively high efficiency.

SUMMARY OF THE INVENTION

The inventors have discovered that such a sorption compression system may be realized by positioning a sorbent in an enclosure between first and second electrical conductors, adsorbing a sorbate onto the sorbent to form a sorbate/sorbent compound, conducting an electrical current through the sorbate/sorbent compound to desorb the sorbate from the sorbent, and repeating the adsorption and desorption steps to cycle the sorbate from a relatively low pressure state during the adsorption reaction to a relatively high pressure state during and after the desorption reaction. The sorbate and sorbent materials are ideally chosen such that the sorbate/sorbent compound will not heat appreciably when the electrical current is conducted therethrough. Consequently, the desorption reaction is substantially non-thermal. Furthermore, the sorbent material optimally has a relatively high thermal conductivity so that the heat of adsorption will be readily dissipated from the sorbent after each adsorption reaction.

In accordance with the present invention, therefore, a sorption compression system is provided that comprises an enclosure which includes first and second electrical conductors, a sorbent which is positioned in the enclosure between the first and second conductors, a sorbate which is capable of combining with the sorbent in an adsorption reaction to form a sorbate/sorbent compound, a power supply which is connected to the conductors and which is selectively actuated to generate a current that is conducted through the sorbate/sorbent compound to desorb the sorbate from the sorbent in a desorption reaction, and a pressure chamber which is connected to the enclosure and which receives the sorbate from the enclosure during the desorption reaction and releases the sorbate into the enclosure during the adsorption reaction. The adsorption and desorption reactions are repeated to cycle the sorbate between a low pressure state and a high pressure state. In addition the desorption reaction is substantially non-thermal. Consequently, the sorbent does not have to be cooled after each desorption reaction. In addition, the sorbent preferably has a relatively high thermal conductivity so that the heat of adsorption will be readily dissipated from the sorbent after each adsorption reaction. Therefore, the efficiency of the sorption compression system is greatly improved over prior art sorption compression systems.

These and other objects and advantages of the present invention will be made apparent from the following detailed description, with reference to the accompanying drawings. In the drawings, the same reference numbers are used to denote similar elements in the various embodiments.

BRIEF DESCRIPTION OF THE DRAWINGS

FIG. 9 is a diagrammatic representation of another embodiment of a sorption compression system of the present invention;

FIG. 10 is a perspective view of a portion of the sorber component of the sorption compression system shown in FIG. 9;

DETAILED DESCRIPTION OF THE PREFERRED EMBODIMENTS

The sorption compression system of the present invention is designed to cycle a sorbate between a low pressure state and a high pressure state by repeatedly adsorbing the sorbate onto a sorbent and then desorbing the sorbate from the resulting sorbate/sorbent compound. The sorption compression system utilizes an electrical current to desorb the sorbate from the sorbate/sorbent compound, and the sorbate and sorbent are specifically selected so that the current will not appreciably heat the sorbate/sorbent compound during the desorption reaction. Consequently, the desorption of the sorbate from the sorbate/sorbent compound is substantially non-thermal. In addition, the sorbent is selected to comprise a relatively high thermal conductivity and is optimally configured to have a minimal mean thermal diffusion path length. As a result, the heat of adsorption that is generated during the adsorption reaction is readily dissipated from the sorbent, and no cool down period is required following each desorption reaction. Therefore, the sorbate can be cycled between the low pressure state and the high pressure state relatively quickly and efficiently.

Figure 1:
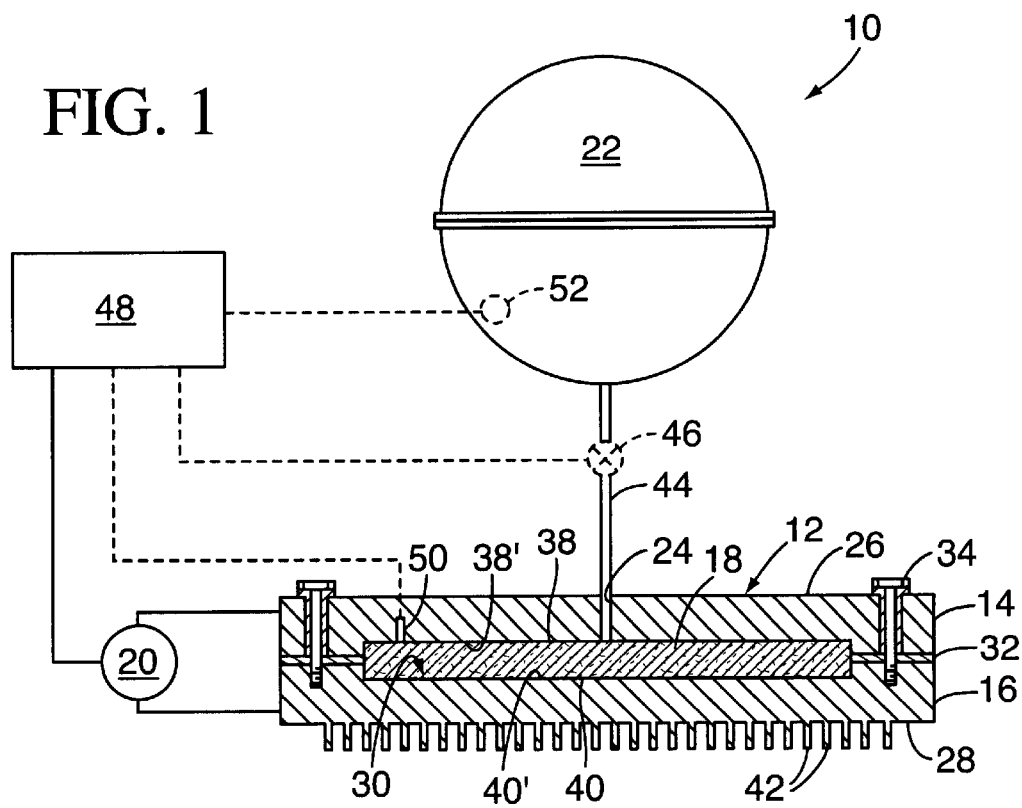
FIG. 1 is a diagrammatic, partial cross-sectional representation of a sorption compression system in accordance with the present invention.
Figure 2:
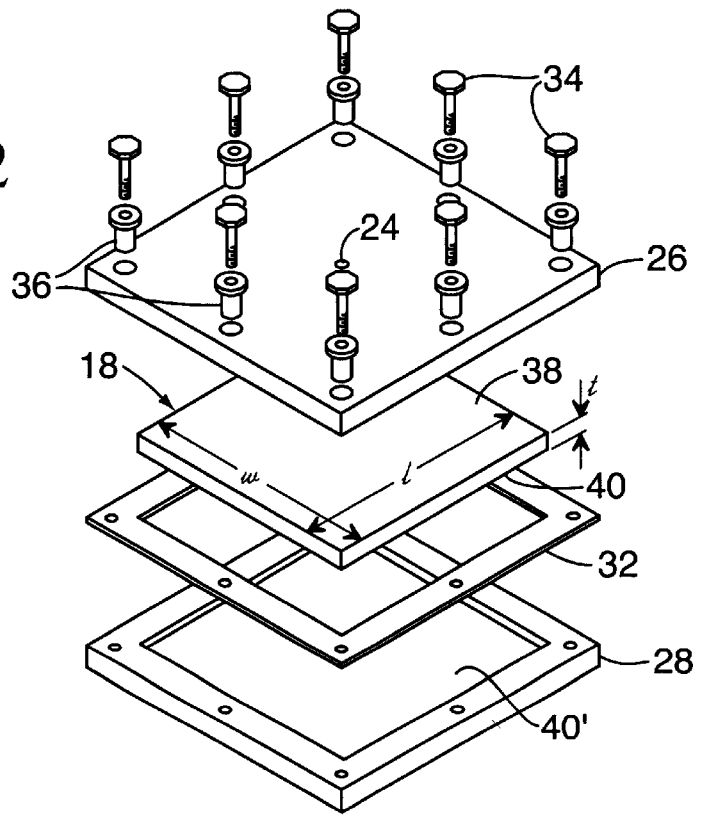
FIG. 2 is an exploded view of the sorber component of the sorption compression system depicted in FIG. 1.

Referring to FIGS. 1 and 2, the sorption compression system of the present invention, which is indicated generally by reference number 10, is shown to comprise a sorber 12 having spaced apart first and second conductors 14, 16, a sorbate/sorbent compound 18 contained within the sorber 12 between the first and second conductors, a power supply 20 connected to the first and second conductors, and a pressure chamber 22 in communication with the sorbate/sorbent compound via an inlet/outlet port 24 in the sorber. During the desorption reaction, which will be described more fully hereafter, an electrical current from the power supply 20 is conducted by the first and second conductors 14, 16 across the sorbate/sorbent compound 18 to desorb the sorbate from the sorbent. The electrical current liberates the sorbate molecules from the sorbent molecules, and the resulting high pressure, high energy sorbate expands through the inlet/outlet port 24 into the pressure chamber 22. During the adsorption reaction, the sorbate in the pressure chamber 22 is communicated through the inlet/outlet port 24 back into the sorber 12 and re-adsorbed onto the sorbent to form the sorbate/sorbent compound 18.

In the embodiment of the invention depicted in FIG. 1, the pressure chamber 22 is simply a fixed pressure vessel. However, the term pressure chamber as used herein is intended to include any sealed containment device which is capable of repeatedly receiving and releasing the sorbate. For example, the pressure chamber could be an evaporator, a refrigeration loop or the expandable pressure chamber of a pump, among other applications. Of course, other sealed containment devices which function as described herein are also considered to be within the scope of the term pressure chamber.

Figure 3:
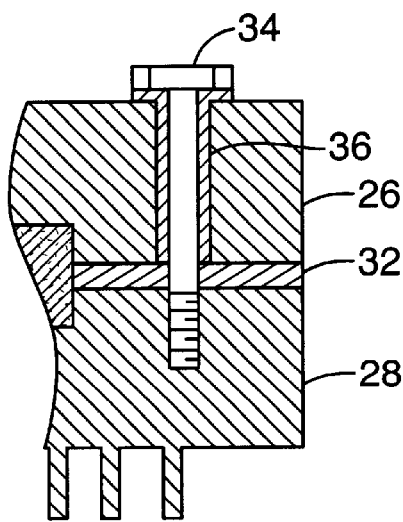
FIG. 3 is an enlarged cross-sectional view of a portion of the sorber component of the sorption compression system shown in FIG. 1.

Since the sorber 12 is the enclosure within which the desorption and adsorption reactions take place, the sorber must function to contain the sorbate/sorbent compound 18, conduct the current from the power supply 20 to the sorbate/sorbent compound, and provide for communication of the sorbate to and from the sorbent. Numerous devices having various structural and electrical configurations may be conceived to perform these functions. By way of example, the sorber 12 depicted in FIGS. 1 and 2 is shown to comprise a recessed top plate 26 which is attached to a recessed bottom plate 28 to form an enclosure 30 for the sorbate/sorbent compound 18. In this embodiment of the sorber 12, the top plate 26 forms the first conductor 14 and the bottom plate 28 forms the second conductor 16. Accordingly, the top and bottom plates 26, 28 are made of a suitable electrically conductive material, such as an Aluminum alloy. In addition, a gasket 32 made of an appropriate electrically insulating, chemically inert and heat resistant material, for example synthetic rubber, is positioned between the top and bottom plates 26, 28 to both electrically insulate and provide a pressure-tight seal between the top and bottom plates. Furthermore, the top and bottom plates 26, 28 are secured together with a number of suitable fasteners 34, such as high strength steel bolts. Also, as shown most clearly in FIG. 3, an insulating grommet 36 which is made of a suitable electrically insulating and heat resistant material, such as Teflon®, is positioned between each bolt 34 and the top plate 26 to electrically insulate the bolt, and thus the bottom plate 28, from the top plate. The sorbate is communicated into and out of the enclosure 30 via the inlet/outlet port 24, which is formed in either the top plate 26 or the bottom plate 28. Of course, any number of separate inlet and outlet ports may be provided for this purpose.

In the embodiment of the invention depicted in FIGS. 1 and 2, the sorber 12 also functions to help dissipate the heat of adsorption from the sorbate/sorbent compound 18. Thus, in addition to being electrically conductive, the top and bottom plates 26, 28 are preferably constructed of a material having a good thermal conductivity. In addition, if as shown in FIGS. 1 and 2 the sorbent comprises relatively large top and bottom surfaces 38 and 40 compared to its thickness "t", the top and bottom plates 26, 28 preferably each include a respective inner surface 38', 40' which engages substantially the entire corresponding top or bottom surface 38, 40. In this manner, the thermal diffusion path length for the sorbate/sorbent compound 18 will be minimized (in effect onehalf the thickness "t"), and the rate of heat transfer from the sorbate/sorbent compound will consequently be maximized. In addition, the top plate 26 or the bottom plate 28, or both, may be provided with cooling fins 42 to assist in the dissipation of the heat of adsorption from the sorbate/sorbent compound 18.

The transfer of thermal and electrical energy through the junction between the sorbent and the sorber 12 is preferably optimized by enhancing the contact between the sorbent and the top and bottom plates 26, 28. Depending on the type of sorbent employed in the sorption compression system 10, this may be accomplished by soldering or brazing the sorbent to the top and/or bottom plates 26, 28. Alternatively, the sorbent may be affixed to the top and/or bottom plates 26, 28 using a suitable thermally and electrically conductive adhesive. Where brazing, soldering or gluing are not appropriate, the sorbent and the sorber 12 may be designed with a slight interference fit to produce a suitable contact pressure between the sorbent and the top and bottom plates 26, 28. The contact between the sorbent and the sorber 12 may also be enhanced by positioning a foil of soft metal, such as indium, between the sorbent and each of the top and bottom plates 26, 28.

While the present invention contemplates that the pressure chamber 22 could be incorporated into the structure of the sorber 12, in the event the pressure chamber is physically removed from the sorber, as in the embodiment of the invention shown in FIG. 1, the sorption compression system 10 includes a conduit 44 connecting the inlet/outlet port 24 with the pressure chamber. In addition, a valve 46 may be provided in the conduit 44 for controlling the flow of sorbate into and out of the sorber 12. The valve 46 may be manually operable; however, to facilitate the automatic operation of the sorption compression system 10, the valve is preferably an electrically actuated solenoid-type valve. Alternatively, in the event the sorber 12 comprises separate inlet and outlet ports instead of a single inlet/outlet port 24, an appropriately oriented check valve may be connected between each port and a corresponding conduit 44 to control the flow of sorbate into and out of the sorber 12.

The selection of the particular sorbate and sorbent materials for the sorption compression system of the present invention depends on the desired nature of the desorption reaction. An important feature of the invention is that, when the electrical current is conducted through the sorbate/sorbent compound to effect the desorption reaction, the sorbate/sorbent compound is not heated appreciably. Thus, the desorption reaction is substantially non-thermal. In the context of the present invention, "non-thermal desorption" refers to a mechanism of desorption that does not rely on thermal energy to stochastically heat the sorbate/sorbent compound to the degree sufficient to break the bonds between the sorbate and sorbent molecules. Thus, while some isolated, localized heating of the sorbate/sorbent compound may occur during the desorption reaction, the temperature of the sorbate/sorbent compound should remain statistically below the threshold temperature for thermal desorption to take place.

One method for determining whether a particular desorption reaction is either thermal or substantially non-thermal is to measure the bulk temperature of the sorbate/sorbent compound during the desorption cycle. If the bulk temperature of the compound during desorption is greater than the known temperature which is required to effect a thermal or heat-activated desorption, then the reaction is thermal. However, if the bulk temperature of the sorbate/sorbent compound during the desorption reaction is less than the temperature required to effect the thermal desorption, the reaction may or may not be thermal. In this event, the velocity distribution of the desorbed sorbate molecules may be analyzed to determine whether the desorption reaction is substantially non-thermal, The molecular velocity distribution can be determined by, for example, using time-of-flight spectroscopy to produce a time-resolved distribution of the florescence intensities of a characteristic molecular beam. Then, using a Fourier transform, the molecular velocity distribution can be extracted from the florescence data. Since it is known that in a non-thermal process the velocity distribution of the desorbed sorbate molecules should be primarily non-Maxwellian, by analyzing the time-of-flight spectroscopy data, the thermal/non-thermal nature of the desorption process can be determined.

The exact mechanism by which the electrical current effects the desorption of the sorbate molecules from the sorbent molecules varies depending on the type of sorbent employed. Moreover, while the exact mechanism is not known, the inventors believe that, when the current is conducted through the sorbate/sorbent compound, electrons are channeled into each sorbate—sorbent bond until the bond is broken and the sorbate molecule is liberated from the sorbent molecule. With respect to the carbon-based sorbents which will be discussed below, one theory is that the electrons from the power supply displace the electrons of the sorbate molecule in the conduction band of the sorbent molecule, thereby freeing the sorbate molecule from the sorbent molecule. Another theory is that the electrons impart sufficient energy to the sorbate molecule to allow it to escape the electrical potential binding it to its associated sorbent molecule. However the sorbate is separated from the sorbent in the present invention, the inventors do not believed that the electrical current resistively heats either the sorbate or the sorbent to an extent sufficient to thermally desorb the sorbate molecules from the sorbent molecules.

In addition to the nature of the desorption reaction, the selection of the sorbate and sorbent materials depends on the requirements of the sorption compression system. For example, in a sorption compression system which is used to drive a pump, such as will be described hereafter, the system may need to provide a particular pressure differential between the sorbate in its low pressure state and the sorbate in its high pressure state in order to produce a desired amount of work. Also, in a sorption compression system which is used to drive a refrigerator, as will also be described hereafter, the system may need to provide a particular temperature differential between the sorbate subsequent to desorption and the sorbate during evaporation Oust prior to adsorption) in order to achieve a desired cooling effect. The pressure and temperature differentials that the sorption compression system is able to achieve are directly related to the affinity between the sorbate and sorbent molecules, which in turn is dependent on the particular sorbate and sorbent materials used in the system. Generally, the desired characteristics of a sorption compression system will suggest the use of a particular sorbate or sorbent material, and then the other material may be determined by examining the vapor pressure curves for various sorbent/sorbate compounds. This selection process will be discussed further in connection with the exemplary sorption compression refrigerator described below.

The sorbate and sorbent materials are preferably also selected based on the desired electrical and thermal conductivities of these materials. Since the desorption reaction is driven by an electric current, the sorbate/sorbent compound should be a good electrical conductor. In addition, in the event that the sorbate molecules bind only to the surface of the sorbent material during the adsorption reaction, the sorbent should also be a good electrical conductor. Moreover, if the power supply 20 is an AC power supply, the sorbate and sorbent materials should ideally be selected so that the combined impedance of the sorber 12 and the sorbate/sorbent compound 18 matches that of the power supply to ensure that the maximum amount of power is transferred from the power supply to the sorbate/sorbent compound. If on the other hand the power supply 20 is a DC power supply, the sorbate and sorbent materials should optimally be selected so that the combined resistance of the sorber 12 and the sorbate/sorbent compound is sufficiently large to avoid overloading the power supply.

Furthermore, Because the heat of adsorption must be dissipated from the sorbate/sorbent compound and the sorbent prior to the next adsorption reaction, both the sorbate/sorbent compound and the sorbent should be good thermal conductors. In a preferred embodiment of the invention, the sorbent comprises a thermal conductivity at least as great as that of aluminum or copper. It has been found that using a sorbent with such a thermal conductivity and a sorbate that meets the other requirements of the sorption compression system will result in a sorbate/sorbent compound that has a sufficient thermal conductivity for purposes of the present invention.

The sorbent should also comprise certain physical properties to enable it to be effectively utilized in the sorption compression system. For example, the sorbent is preferably sufficiently strong to withstand repeated adsorption and desorption reactions without fracturing or decomposing. In addition, the sorbent is ideally comprised of a material that can be soldered or brazed to the sorber to enhance the transfer of thermal and electrical energy through the junction between the sorbent and the sorber. Furthermore, the sorbent is optimally configured or constructed to comprise suitable mass transfer paths to facilitate the passage of a maximum amount of sorbate through the sorbent in a minimum amount of time during the adsorption and desorption reactions. Also, since the total amount of sorbate that can be adsorbed on a sorbant is proportional to the total surface area of the sorbent, the sorbent preferably comprises a relatively large surface area per unit volume of material.

Consistent with the above discussion, a preferred sorbent material for use in the present invention is a pitch-based carbon or graphitic foam product, such as described in U.S. Pat. No. 5,961,814, which is hereby incorporated herein by reference. As discussed in this patent, these foam products can be made from any organic or synthetic pitch, for example AR Resin® manufactured by Mitsubishi Gas Chemical Company of Tokyo, Japan. In order to produce a foam having a desired microcellular structure, the starting pitch particles ideally comprise a mean size of between about 0.5 to 10 microns. The pitch particles are pressed in a mold under a pressure of between 100 to 2,000 psi to produce a pressed pitch article. This pitch is then placed in a pressure vessel, and an inert gas is introduced into the vessel under a pressure of between 200 to 500 psi to force the gas into the voids between the pitch particles. The pitch is then heated to between 10° to 40° C. above the melting temperature of the pitch while additional inert gas is introduced into the vessel to achieve a final pressure within the vessel of between 1,000 to 1,500 psi. The pitch is held under this pressure and temperature for between 10 and 40 minutes, and then the pressure is rapidly vented to atmosphere. As the pressure decreased, the gas will expand to form bubbles within the pitch, and these bubbles will further expand and break to form an open-celled foam structure. The foam is then preferably stabilized by subjecting the foam to an oxygen or air atmosphere at a temperature of between 150° and 260° C. for about 18 to 24 hours. The stabilized foam can be carbonized by slowly heating the foam under an inert atmosphere to between 800° and 900° C. The carbon foam may be graphitized by slowly heating the foam under an inert atmosphere to between 2,400° and 3,000° C.

In accordance with one embodiment of the present invention, the graphitic foam is then activated by soaking the foam with a 10% by weight solution of potassium hydroxide and water at between about 1,000° and 2,800° C. for approximately 2 hours or until the weight of the foam is reduced by between about 5% to 10%. The resulting foam will have a desired density of between about 0.95 and 1.00 g/cc. In addition, during the foaming process, fullerenes or nanotubes may be mixed with the melted pitch in order to increase the adsorption capacity, thermal conductivity and mechanical strength of the resulting foam. The exact percentages of such materials may be determined empirically for a desired result.

Another preferred sorbent which can be used in the present invention is a material comprised of carbon fullerenes, such as is described in the text by M. S. Dresselhaus and G. Dresselhaus, *Fundamental Properties of Fullerenes*, Springer Verlag GmbH, 2000, which is hereby incorporated herein by reference. Unlike the carbon and graphitic foams discussed above, the resistivity of the fullerene material can be changed through the process of doping to better match the impedance of the power supply. Undoped fullerene material has a fairly high resistivity of about $10^{14}$ $\Omega$-cm. If the fullerene material is oxygen free, the resistivity may drop to $10^8$ $\Omega$-cm. The minimum resistivity of doped fullerene material has been found to be $10^{-3}$ $\Omega$-cm. Thus, the dynamic range of resistivity for a fullerene material can be made to cover seventeen orders of magnitude.

Still another preferred sorbent which is suitable for use in the present invention is a material comprised of carbon nanotubes. Carbon nanotubes and composite materials comprising carbon nanotubes include unique molecular structures that allow for a nearly one-to-one pairing of sorbate to sorbent atoms. As a result, the sorbate/sorbent compound typically comprises a much higher density of sorbate than is possible using traditional sorbent materials. Consequently, the sorption compression system will require less sorbent for a required amount of sorbate.

Yet another preferred sorbent material for the present invention is a composite material which includes nanostructured semiconductor clusters, such as described in U.S. Pat. No. 6,107,243, which is hereby incorporated herein by reference. As discussed in this reference, the clusters are formed in a suitable mesoporous host material having pores of between about 1.3 and 10 nm in diameter. Accordingly, the clusters are distributed relatively densely within the host material. Consequently, a sorbent comprised of such a composite material will typically have an increased adsorption capability over a bulk corbent material. In a preferred sorbent of this type, the cluster spacing should be close enough to allow the clusters to be electrically coupled, but far enough apart to minimize electron-phonon coupling. Thus, the semiconductor clusters are ideally smaller than about 10 nm and are spaced apart by about 2 nm or less. The host material is preferably a crystalline structure, such as zeolite or sintered solgel, or a highly cross-linked conjugated polymer.

Other sorbent materials which are suitable for use in the present invention include organometallic composite semiconductors. Organometallic materials are electrically insulating and must be doped in order to conduct electricity. According to the present invention, therefore, the organometallic sorbent material is doped with the sorbate. This doping is typically accomplished through a redox reaction in which the sorbate acts as either an electron acceptor or donor. The dopant anions can be driven out of the sorbent by providing a cathodic or anodic pulse of current through the sorbate/sorbent compound. Once the sorbate is desorbed from the sorbent, the sorbent will no longer conduct electricity. An example of this type of sorbent is a composite material having nanographitic clusters of a metallophthaloxyanine based sorbent supported by, for example, a high surface area graphite or zeolite structure.

In the embodiment of the invention shown in FIGS. 1 and 2, the sorbent is formed into a monolithic member having a thickness "t" and generally parallel top and bottom surfaces 38, 40 which each have a length "I" and a width "w". Although the surfaces 38, 40 are depicted as rectangular, they could have any practical shape. Since in this embodiment the top and bottom plates 26, 28 of the sorber 12 function to both conduct the electrical current across and dissipate the heat of adsorption from the sorbate/sorbent compound 18, the electrical conduction and thermal diffusion paths are both aligned in the direction of the thickness "t" of the sorbent. As mentioned above, in order to maximize the amount of power which is transferred to the sorbate/sorbent compound from an AC power supply, the combined impedance of the sorber 12 and the sorbate/sorbent compound 18 should match that of the power supply. Thus, for given sorbate and sorbent materials, the thickness "t" of the sorbent may be increased or decreased to adjust the impedance accordingly. In addition, in order to minimize the thermal diffusion path length, the thickness "t" of the sorbent should be kept as small as possible. In the event the heat of adsorption is dissipated through both the top and bottom surfaces 38, 40, the thickness "t" is preferably less than the smallest linear dimension of the top or bottom surface, which, for example, is the length of the minor side of a rectangle, the length of any side of a square, or the length of the diameter of a circle. If the heat of adsorption is dissipated through only one of the top and bottom surfaces 38, 40, the thickness "t" is preferably less than one-half the smallest linear dimension of the top or bottom surface. More preferably, the thickness "t" is less than onetenth the smallest linear dimension of the top or bottom surface. By sizing the sorbent accordingly, the minimum thermal diffusion path length will be transverse to the top and bottom surfaces, and the heat of adsorption will consequently be readily dissipated through either or both of these surfaces.

As discussed above, the sorbate which is employed in the sorption compression system depends largely on the purpose of the system and the particular sorbent chosen for the system. The inventors have discovered that suitable sorbates for use with the carbon and graphitic foam sorbents discussed above are R134, Ammonia, Carbon Dioxide, Nitrous Oxide, Nitrogen, Krypton, Hydrogen and Methane, among others. These sorbates are readily desorbed by an electrical current, form a sorbate/sorbent compound that will not heat appreciably during the desorption reaction, and are capable of being cycled between a low pressure state and a high pressure state by being repeatedly adsorbed onto and desorbed from the sorbent.

The sorbate/sorbent compound is preferably carefully prepared prior to operation of the sorption compression system 10. Referring again to FIG. 1, a predetermined amount of sorbent is sealed within the enclosure 30 of the sorber 12 and the inlet/outlet port 24 is connected to a vacuum source (not shown). With a vacuum applied to the enclosure 30, an electrical current is conducted through the sorbent to drive off any water molecules or other contaminants that may be present in the sorbent. During this preparation step, the current may result in the sorbent being resistively heated, depending on the amount of contaminants that are present in the sorbent and the type of sorbent that is used. If so, then it is desired that the sorbent be heated to about 200° C. to ensure that the contaminants are sufficiently separated from the sorbent. This step is desirable to ensure that no contaminants are present that may interfere with the adsorption of the sorbate onto the sorbent or result in the sorbate/sorbent compound being resistively heated by the current during operation of the sorption compression system 10. After the contaminants are separated from the sorbent, they are drawn out of the sorber 12 by the vacuum. With the vacuum source removed, but with vacuum pressure maintained within the enclosure 30, the sorber is allowed to cool to ambient temperature, after which a predetermined amount of sorbate is introduced into the enclosure, for example via the inlet/outlet port 24, and allowed to adsorb onto the sorbent. At this point, the sorbent is "charged" with the sorbate and the sorption compression system is ready for operation.

In operation of the sorption compression system 10, the desorption cycle is initiated by activating the power supply 20 to generate a preferably DC current through the first and second conductors 14, 16 and across the sorbate/sorbent compound 18. The amount of power and the approximate length of time required to complete the desorption cycle are dependent on the amounts and types of sorbate and sorbent materials used in the sorption compression system. For example, if the system requires $X_{sorbate}$ grams of sorbate and it is known that $E_{desorb}$ joules of energy are required to desorb one gram of sorbate from the sorbent, then a total of $E_{desorb}$ joules/gram times $X_{sorbate}$ grams=$E_{total}$ joules of energy will be required to completely desorb the sorbate from the sorbent. The total desorption time, $t_{desorb}$, is obtained by dividing $E_{total}$ by the applied power level, $P_{supply}$. As the sorbate molecules are desorbed from the sorbate, the resulting high pressure sorbate will expand through the inlet/outlet port 24 and into the pressure chamber 22, where it will remain until the adsorption cycle commences.

Once the desorption cycle is complete, the system is immediately ready to commence the adsorption cycle. This is due to the fact that, although the temperature of the sorbent must be near ambient in order to effectively adsorb the sorbate molecules, as discussed above the electrical current preferably does not heat the sorbate/sorbent compound appreciably during the desorption reaction. Consequently, the sorbent remains near ambient temperature following the desorption reaction. The adsorption cycle is initiated by releasing the sorbate into the enclosure 30 of the sorber 12. Due to the affinity between the selected sorbate and sorbent molecules, the sorbate molecules will be drawn into the enclosure 30 and adsorbed onto the sorbent. The pressure of the sorbate during the adsorption reaction is substantially lower than the pressure of the sorbate following the desorption cycle and corresponds to a desired vapor pressure of the sorbate, which in turn is dependent on the temperature of the sorbate prior to adsorption and the affinity between the sorbate and sorbent molecules. Thus, a desired pressure differential for the sorbate may be achieved by selecting appropriate sorbate and sorbent materials from the vapor pressure curves for various sorbate/sorbent compounds.

In a preferred embodiment of the invention, a sufficiently small amount of sorbate is employed which can be cycled relatively quickly through the system. In this manner, a near continuous cycling of the sorbate is achieved which results in a high system capacity per unit volume of sorbate. Such a rapid cycling of the sorbate is possible in the present invention since the desorption reaction is substantially non-thermal.

Furthermore, a particularly advantageous feature of the present invention is the ability to cycle less than the entire amount of sorbate. Such a partial desorption can be achieved by applying the electrical current to the sorbate/sorbent compound for less than the entire amount of time required to effect a complete desorption. Since upon activation of the power supply the electrical current will immediately begin desorbing the sorbate molecules from the sorbent molecules, a proportionately larger amount of sorbate is separated from the sorbent as the desorption reaction progresses. As discussed above, the time required to desorb a given amount of sorbate with a particular power source can be readily determined. Thus, if one desires to desorb only a percentage of the available sorbate, then the current is applied for approximately the same percentage of time. Another portion or the remaining amount of sorbate may be desorbed subsequently. Alternatively, since the desorption reaction is substantially non-thermal, the desorbed portion of the sorbate may be re-adsorbed onto the sorbent.

In the preferred embodiment of the invention, the sorption compression system comprises a programmable controller 48 to manage the execution of the desorption and adsorption cycles in response to preprogrammed instructions stored in an associated memory device. Thus, the controller 48 controls the activation of the power supply 20 to initiate and terminate each desorption cycle. Over a number of desorption and adsorption cycles, a plot of the power supply current versus time would appear as a series of "pulses", with the length of each pulse corresponding to the duration of the desorption cycle. While the length of each pulse may be estimated based on the calculated duration of the desorption cycle, the sorption compression system 10 preferably includes a transducer 50 connected to the controller 48 to measure a condition of the sorbent or the sorbate/sorbent compound which is indicative of the end of the desorption cycle. For example, when the sorbent comprises a carbon based material, the current will tend to resistively heat the sorbent after the sorbate has been desorbed. Therefore, the transducer 50 could comprise a temperature sensor, which would enable the controller to monitor the temperature of the sorbent and deactivate the power supply 20 when a predetermined increase in the temperature is detected. Also, as the sorbate is desorbed from the sorbate/sorbent compound, the impedance of the sorbate/sorbent compound will decrease. Thus, the transducer 50 could comprise an impedance sensor, which would allow the controller 48 to sense the change in impedance of the sorbate/sorbent compound and deactivate the power supply 20 when a desired amount of sorbate, which may be less than the entire amount of sorbate, has been desorbed. Alternatively or in addition to the transducer 50, a suitable transducer 52 could be connected to the pressure chamber 22 to sense a desired condition of the sorbate. For example, the pressure of the sorbate in the pressure chamber 22 is directly related to the temperature of the sorbate, the volume of the pressure chamber and the amount of sorbate within the pressure chamber. Therefore, the transducer 52 could comprise a pressure sensor, which would permit the controller 48 to monitor the pressure of the sorbate and deactivate the power supply 20 when a desired amount of sorbate has been desorbed.

The controller 48 also preferably actuates the valve 46 to initiate and terminate each adsorption cycle. To begin the adsorption cycle, the controller 48 generates an appropriate signal to open the valve 46. This will allow the sorbate to be drawn into the enclosure 30 and adsorbed onto the sorbent. When a desired amount of sorbate has been adsorbed, the controller 48 will close the valve 46. However, if the entire amount of sorbate within the pressure chamber 22 has been adsorbed, no need exists to close the valve 46 and it may therefore remain open. If the valve 46 has been closed at the end of the adsorption cycle, the controller 48 will open the valve at the beginning of the next desorption cycle.

It should be noted that, depending on the sorbent material selected for the sorption compression system 10, a valve 46 may not be necessary to control the flow of sorbate into the enclosure 30. As discussed above, certain sorbent materials, such as organometallic materials, are poor electrical conductors in the absence of a sorbate. Thus, once the sorbate has been completely desorbed from the sorbent, the current will not resistively heat the sorbent. However, the small current flux through the sorbent will prohibit the sorbate molecules from re-adsorbing on the sorbent. Therefore, the power supply 20 can be activated to initiate the desorption cycle, and can be left on until the adsorption cycle is ready to commence, whereupon the power supply is deactivated.

Figure 4:
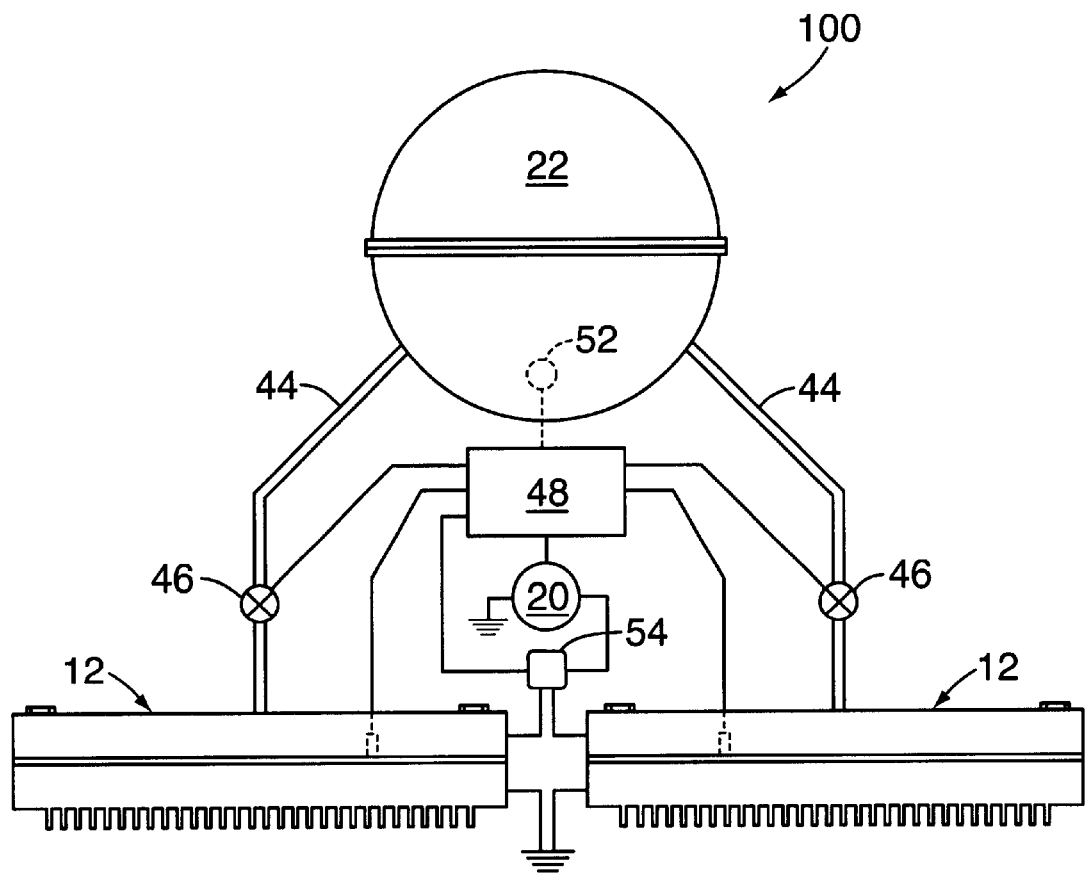
FIG. 4 is a diagrammatic representation of another embodiment of a sorption compression system in accordance with the present invention.

Referring now to FIG. 4, another embodiment of a sorption compression system according to the present invention, which is indicated generally by reference number 100, is shown to comprise two sorbers 12 connected to a single pressure chamber 22 by corresponding conduits 44. Depending on the requirements of the sorption compression system, the sorbers may be operated simultaneously or sequentially. Simultaneous operation of the sorbers may be appropriate, for example, when it is desired to pressurize the pressure chamber 22 relatively quickly. The operation of the sorption compression system 100 in this instance is similar to the operation of the sorption compression system 10 described above. However, in this embodiment current is conducted to both sorbers 12 concurrently when the controller 48 activates the power supply 20.

Sequential operation of the sorbers 12 may be desired, for example, when a need exists to rapidly cycle high pressure sorbate gas into the pressure chamber 22. Ideally, while a desorption cycle is being executed in one sorber 12, an adsorption cycle is being carried out in the other sorber 12. Consequently, high pressure sorbate gas may be communicated into the pressure chamber 12 on a near-continuous basis. In addition, this sequential operation of the sorbers 12 will provide a period of time after each adsorption cycle during which the heat of adsorption is allowed to dissipate from the sorbate/sorbent compound. In order to facilitate the sequential operation of the sorbers 12, the sorption compression system 100 preferably includes a switch 54 connected between the power supply 20 and the first conductor 14 of each sorber 12. In addition, the switch is ideally controlled by the controller 48. Thus, the controller can activate the power supply 20 and the switch 54 to conduct the electrical current to each sorber 12 in turn.

Figure 5:
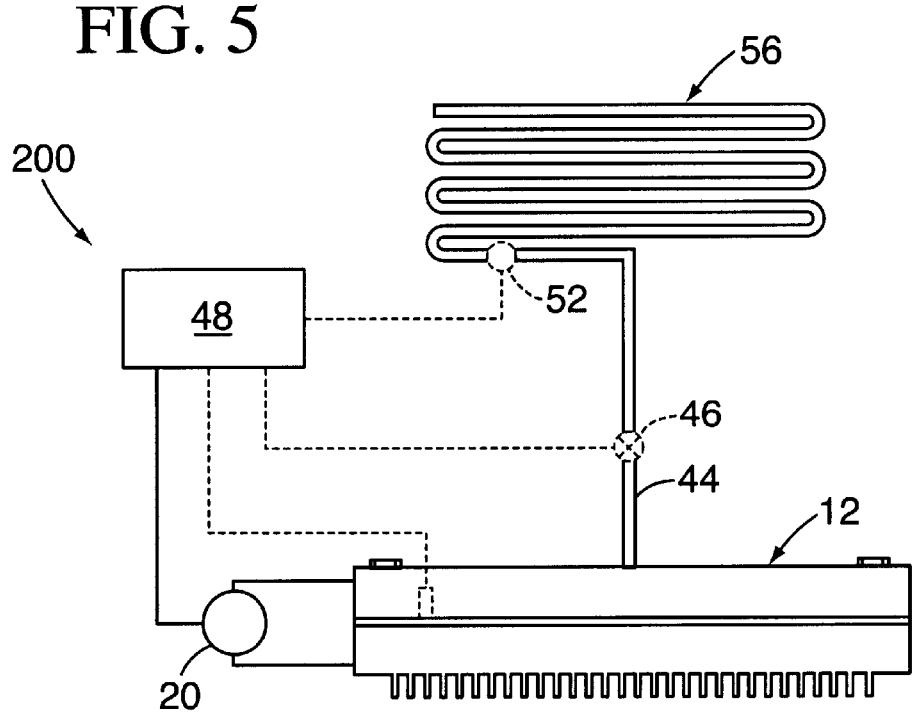
FIG. 5 is a diagrammatic representation of the sorption compression system of FIG. 1 which is adapted for use as a refrigerator.

The sorption compression systems of the present invention can be used in numerous applications. For example, FIG. 5 illustrates a sorption compression system 200 which is adapted for use as a refrigerator. The sorption compression system 200 is similar in many respects to the sorption compression system 10; however, in the sorption compression system 200 the pressure chamber 22 is configured as an evaporator 56. Thus, during the desorption cycle the high pressure sorbate is communicated into the evaporator. The volume of the evaporator 56 is selected based on the amount of sorbate employed to cause the sorbate to condense within the evaporator at a predetermined pressure and temperature. When a cooling effect is desired, the adsorption cycle is initiated, whereupon the liquid sorbate within the evaporator 56 will evaporate to produce the cooling effect as the sorbate is drawn onto the sorbent within the sorber 12.

Figure 6:
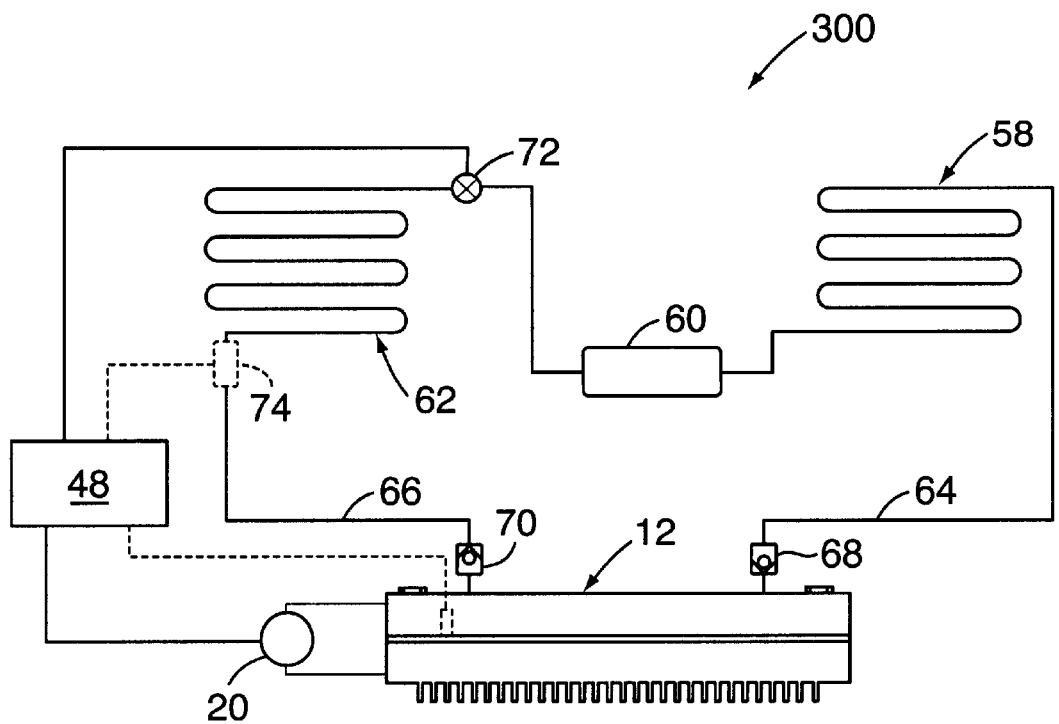
FIG. 6 is a diagrammatic representation of the sorption compression system of FIG. 1 which is shown integrated into a refrigeration system.

FIG. 6 depicts another embodiment of the present invention in which a sorption compression system 300 is adapted for use as a refrigerator. In this embodiment, the pressure chamber 22 of the sorption compression system 10 is replaced with a closed refrigeration loop comprising an optional condenser 58, a reservoir 60 and an evaporator 62. The input of the condenser 58 is connected with the enclosure 30 of the sorber 12 via an output conduit 64. Similarly, the output of the evaporator 62 is connected with the enclosure 30 via an input conduit 66. In addition, the reservoir 60 is connected between the output of the condenser 58 and the input of the evaporator 62. Furthermore, suitable check valves 68 and 70 may be provided in the output conduit 64 and the input conduit 66, respectively, to control the flow of the sorbate through the system and into and out of the sorber 12.

In the ideal sorption compression system 10, the condenser 58 is not required since thermal energy is not transferred to the sorbate during the desorption reaction. However, in the event any heat is transferred to the sorbate during the desorption or adsorption reactions, a condenser 58 may be provided to dissipate this heat. However, such a condenser would be smaller than is typically required in sorption compression refrigeration systems. Furthermore, depending on the requirements of the system, the condenser 58 may be dispensed with and the sorbate vented directly into the receiver 60, or, if the volume of the conduit between the check valve 68 and the evaporator 62 is sufficiently large, both the condenser 58 and the receiver 60 may be omitted.

The evaporator 62 is designed using conventional refrigeration techniques to have the capacity and configuration required to achieve a desired cooling do effect. A flow control valve 72, for example a TEV, is preferably provided upstream of the evaporator 62 to selectively discharge the liquid sorbate into the evaporator. The TEV 72 is a conventional electrically-controlled, solenoid-actuated valve. The particular TEV selected should have a capacity large enough to accommodate the mass flow rate of the sorbate in the system. In accordance with the exemplary refrigeration sorption system described herein, the operation of the TEV 72 is dependent on the pressure in the evaporator 62, which is measured by a suitable pressure sensor 74 that is located, for example, at the output of the evaporator 62 and is connected to the controller 48. In order to prevent the sorbate from evaporating inside the TEV 72, the sorbate may be channeled through a capillary tube which is inserted into the outlet of the TEV and extends into the evaporator 62 to a point where the load to be cooled is expected to be concentrated. The diameter of the capillary tube is typically selected to be between about 0.004 to 0.030 inch, depending on the mass flow rate of the sorbate.

In operation of the sorption compression refrigerator 300, the controller 48 activates the power supply 20 to begin a desorption cycle. During the desorption cycle, the high pressure sorbate gas expands past check valve 68 and into the condenser 58, if present, where it condenses into a relatively high pressure liquid. The liquid sorbate is then communicated into the reservoir 60, where it is held by the TEV 72 until a cooling cycle is to begin. During the cooling cycle, which corresponds to the adsorption cycle in the embodiment of the invention depicted in FIG. 6, liquid sorbate is preferably controllably released by the TEV 72 into the evaporator 62. The controller 48 senses the evaporator pressure ($P_{evp}$) and compares this to the vapor pressure of the sorbate at the desired evaporator temperature ($P_v$). If $P_{evp}$ is less than or equal to $P_v$, then the controller 48 pulses the TEV 72 to release the sorbate into the evaporator 62. The sorbate evaporates to produce a cooling effect and, due to the affinity between the sorbate and the sorbent, the evaporated sorbate is drawn through the check valve 70 and into the sorber 12. Further details concerning the control of the refrigeration cycle and, in particular, the operation of the TEV 72 can be found in the aforementioned U.S. Pat. No. 5,842,356, which is hereby incorporated herein by reference.

Figure 7:
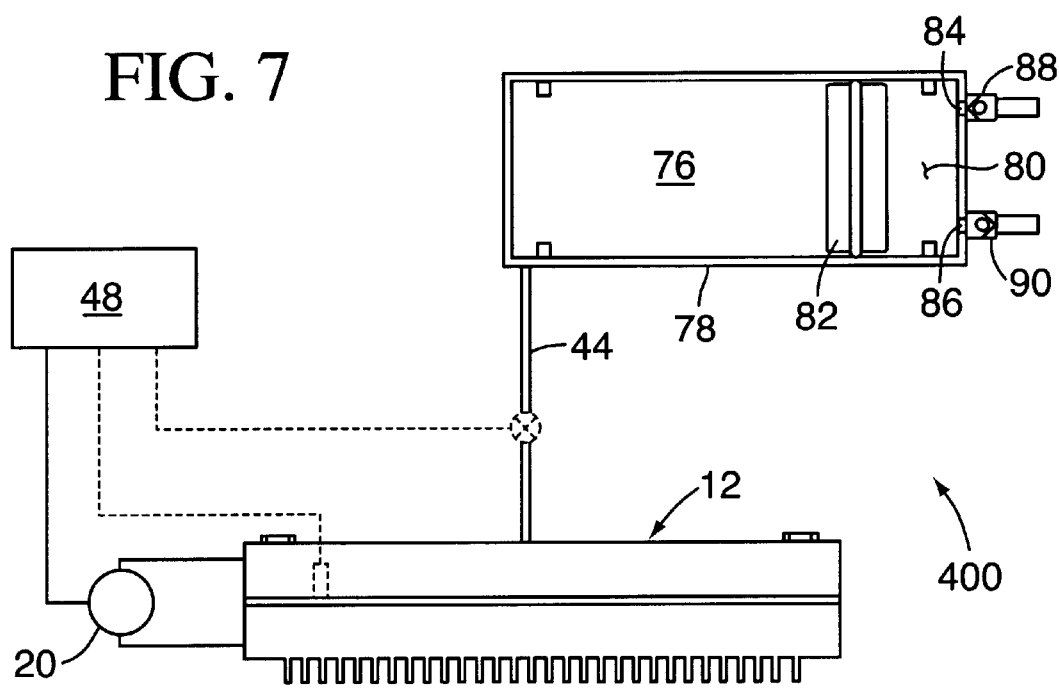
FIG. 7 is a diagrammatic representation of the sorption compression system of FIG. 1 which is adapted for use as a piston pump.

The sorption compression system of the present invention may also be used to drive a pump, such as the sorption compression piston pump 400 shown in FIG. 7. In this embodiment of the invention, the pressure chamber 22 of the sorption compression system 10 is configured as the pressure chamber 76 of a piston cylinder 78. The pressure chamber 76 is separated from a pumping chamber 80 by a movable piston head 82. During the compression stroke of the piston pump 400, which corresponds to the desorption cycle of the sorption compression system, high pressure sorbate gas enters the pressure chamber 76 and forces the piston head 82 to the right as viewed in FIG. 7. The displacement of the piston head 78 pushes fluid in the pumping chamber 80 out through an outlet port 84. During the expansion stroke of the piston pump 400, which corresponds to the adsorption cycle of the sorption compression system, the sorbate in the pressure chamber 76 is drawn back into the sorber 12. This pulls the piston head 82 to the left and consequently draws fluid through an inlet port 86 into the pumping chamber 80. Suitable check valves 88 and 90 may be provided to ensure that the fluid is not drawn in through the outlet port 84 during the expansion stroke or pushed out through the inlet port 86 during the compression stroke.

Figure 8:
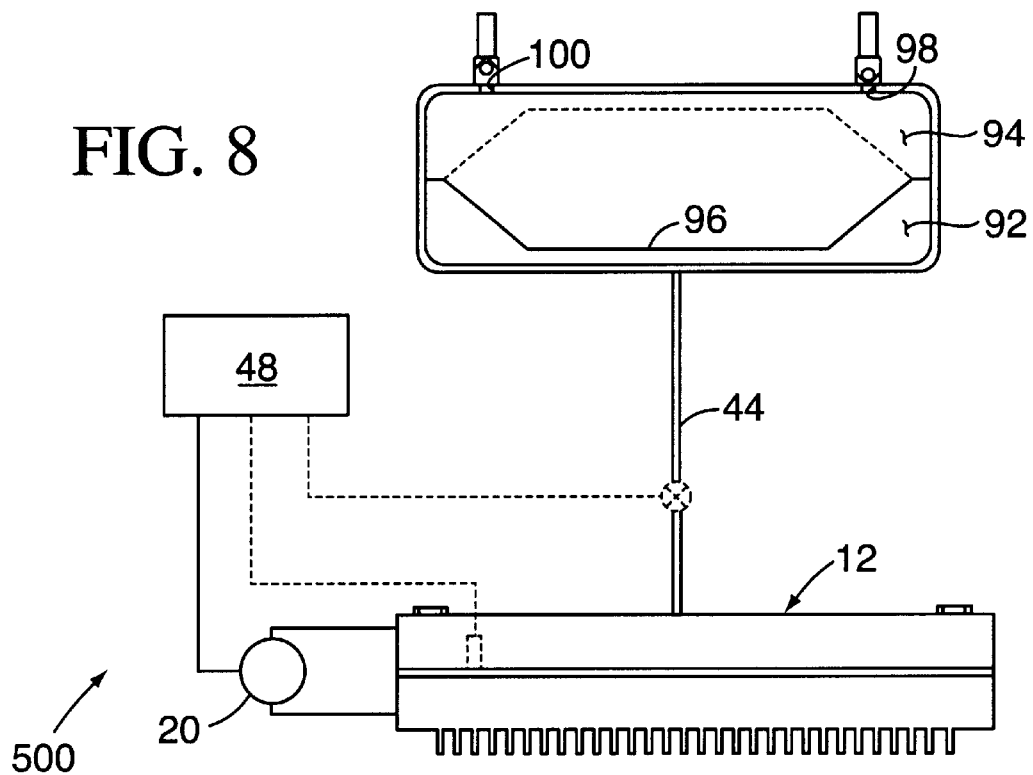
FIG. 8 is a diagrammatic representation of the sorption compression system of FIG. 1 which is adapted for use as a diaphragm pump.

The sorption compression system of the present invention may also be utilized in other types of pumps, such as the sorption compression diaphragm pump 500 shown in FIG. 8. In this embodiment of the invention, the pressure chamber 22 of the sorption compression system 10 is configured as the pressure chamber 92 of the diaphragm pump 500. The pressure chamber 92 is separated from a pumping chamber 94 by a flexible diaphragm 96. In operation, during the desorption cycle the high pressure sorbate expands into the pressure chamber 92 and forces the diaphragm 96 upward into the position shown in phantom in FIG. 8. This displacement of the diaphragm 96 forces fluid in the pumping chamber 94 out through an outlet port 98. During the adsorption cycle, as the sorbate is drawn back into the sorber 12 the diaphragm 96 is pulled back into its original position. The displacement of the diaphragm 96 in this manner causes fluid to be pulled into the pumping chamber 94 through an inlet port 100. As in the previous embodiments, check valves may be provided at the inlet and outlet ports 98, 100 to control the flow of fluid through these ports.

Figure 11:
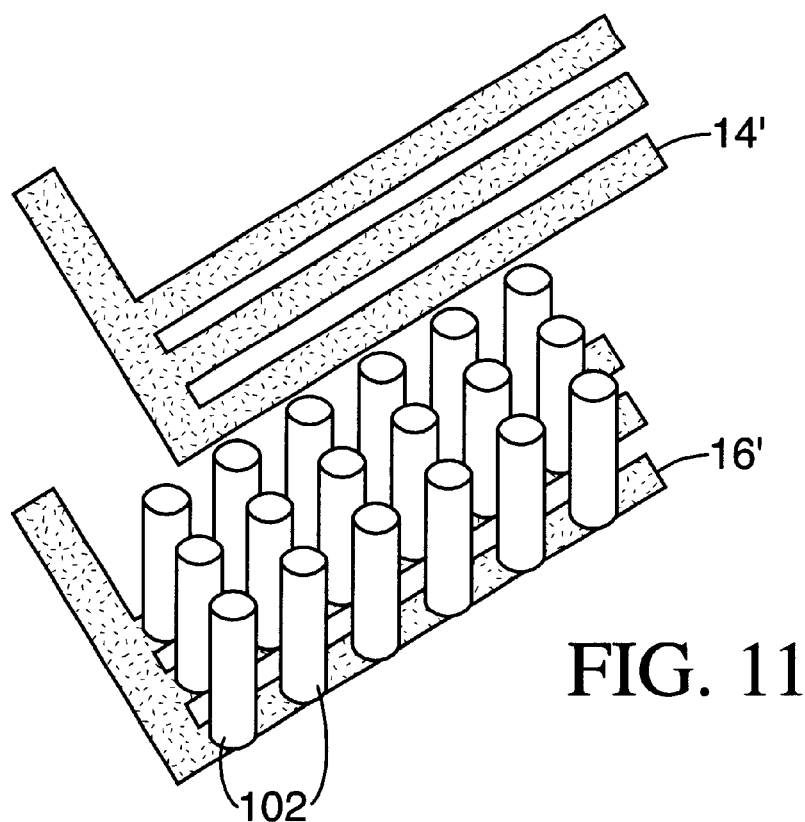
FIG. 11 is a partial, exploded view of the sorbent and conductor components of the sorption compression system shown in FIG. 9.

In the sorption compression system 10 discussed above, the electrical conduction and minimum thermal diffusion paths coincide. However, this need not be the case. For example, referring to FIGS. 9–11, a sorption compression system is shown wherein the electrical conduction path is perpendicular to the minimum thermal diffusion path. The sorption compression system of this embodiment, which is indicated generally by reference number 600, comprises a sorber 12' in which is positioned a sorbent 18' that is formed into a plurality of monolithic tube-shaped members 102. As shown most clearly in FIG. 11, the monolithic members 102 extend longitudinally between the first and second conductors 14', 16'. Although the first and second conductors 14', 16' may be the top and bottom plates 26', 28' of the sorber 12', in this embodiment the sorber is comprised of an electrically insulating material, such as ceramic, and the first and second conductors comprise metallic strips which are affixed to the top and bottom plates, respectively. Thus, it may be seen that the electrical conduction path through the sorber 18' is parallel to the longitudinal axes of the monolithic members 102. Also, the minimum thermal diffusion path through each monolithic member 102 is perpendicular to longitudinal axis of the monolithic member. Thus, the electrical conduction path through the sorbent 18' is perpendicular to the minimum thermal diffusion path through the sorbent.

Figure 12:
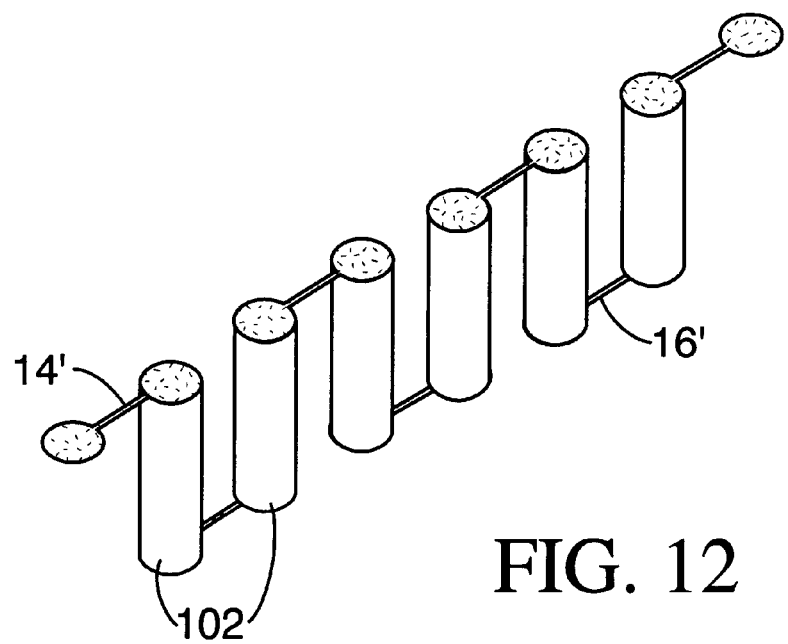
FIG. 12 is a partial view of an alternative arrangement of the sorbent and conductor components of the sorption compression system shown in FIG. 9.

The formation of the sorbent 18' into individual monolithic members 102 may be necessary, for example, to achieve a desired impedance through a particular sorbent material while minimizing the thermal diffusion path through the material. In the embodiment shown in FIG. 11, the monolithic members 102 extend in a parallel fashion between the first and second conductors 14', 16'. However, if desired, the monolithic members 102 may be connected in series fashion between the conductors, as shown in FIG. 12.

Also, although not necessary for the preferred embodiment of the invention, the sorption compression system 600 may include an ancillary cooling means to help dissipate the heat of adsorption from the sorbate/sorbent compound. Referring specifically to FIGS. 9 and 10, the heat of adsorption will be conducted through the sorbate/sorbent compound and into the portions of the chamber 30' which are located between the monolithic members 102. In order to remove this heat from the chamber 30', the sorber 12' preferably includes a first vent port 104 located at one end of the sorber, a second vent port 106 located at an opposite end of the sorber, a cooling loop 108 connected between the first and second vent ports, a pump 110 for pumping an appropriate cooling fluid through the cooling loop and the chamber 30', and suitable valves 112, 114 disposed adjacent the first and second vent ports 104, 106 for controlling the flow of cooling fluid through the chamber and preventing the escape of sorbate into the cooling loop during the desorption reaction. The valves are preferably solenoid-type valves which are actuated by the controller (not shown). Also, the pump 110 is ideally activated by the controller during and after the adsorption reaction, but is deactivated during the desorption reaction. Thus, during and after the desorption reaction, the cooling fluid is pumped through the chamber 30' to remove the heat of adsorption, which in turn is dissipated in the cooling loop 108. As an alternative to the cooling means just discussed, the cooling means could simply comprise a fan for blowing ambient air through the first and second vent ports 104, 106.

It should be recognized that, while the present invention has been described in relation to the preferred embodiments thereof, those skilled in the art may develop a wide variation of structural and operational details without departing from the principles of the invention. For example, the various elements shown in the different embodiments may be combined in a manner not illustrated above. Therefore, the appended claims are to be construed to cover all equivalents falling within the true scope and spirit of the invention.

We claim:

1. A sorption compression system which comprises:
   an enclosure which includes first and second spaced-apart electrical conductors;
   a sorbent which is positioned in the enclosure between the first and second conductors;
   a sorbate which is capable of combining with the sorbent in an adsorption reaction to form a sorbate/sorbent compound;
   a power supply which is connected to the first and second conductors and which generates an electrical current that is conducted through the sorbate/sorbent compound to desorb the sorbate from the sorbent in a desorption reaction; and
   a pressure chamber which is connected to the enclosure and which receives the sorbate from the enclosure during the desorption reaction and releases the sorbate into the enclosure during the adsorption reaction;
   wherein the adsorption and desorption reactions are repeated to cycle the sorbate between a relatively low pressure state during the adsorption reaction and a relatively high pressure state during the desorption reaction; and
   wherein the desorption reaction is substantially non-thermal.

2. The sorption compression system of claim 1, further comprising a controller for selectively activating the power supply to initiate and terminate each desorption reaction.

3. The sorption compression system of claim 2, further comprising at least one valve for controlling the flow of sorbate between the enclosure and the pressure chamber.

4. The sorption compression system of claim 3, wherein the valve is actuated by the controller.

5. The sorption compression system of claim 1, wherein:
   the enclosure comprises an electrically conductive first member, an electrically conductive second member which is connected to the first member, and an electrical insulator which is positioned between the first and second members; and
   the first and second conductors comprise the first and second members, respectively.

6. The sorption compression system of claim 5, wherein:
the sorbent comprises first and second spaced-apart, generally parallel surfaces and a thickness which is transverse to the first and second surfaces; and
the thickness is less than the square root of the area of the first and second surfaces.

7. The sorption compression system of claim 6, wherein the adsorption reaction produces a heat of adsorption which is conducted through the sorbent and the first and second members.

8. The sorption compression system of claim 5, wherein the sorbent is attached to the first and/or the second member.

9. The sorption compression system of claim 1, wherein the pressure chamber comprises an evaporator.

10. The sorption compression system of claim 1, wherein the pressure chamber comprises a refrigeration loop which includes an evaporator.

11. The sorption compression system of claim 1, further comprising:
a pump which includes a first chamber that is connected to the enclosure, a second chamber that is separated from the first chamber by a movable member, and valve means for controlling the flow of a fluid into and out of the second chamber in response to movement of the movable member;
wherein the pressure chamber comprises the first chamber.

12. The sorption compression system of claim 1, wherein the sorbate/sorbent compound comprises an impedance which is approximately the same as the impedance of the power supply.

13. The sorption compression system of claim 1, wherein the sorbent comprises a carbon foam material.

14. The sorption compression system of claim 1, wherein the sorbent comprises a graphitic foam material.

15. The sorption compression system of claim 1, wherein the sorbent comprises a nano-structured semiconductor material.

16. The sorption compression system of claim 1, wherein the sorbent comprises fullerenes.

17. The sorption compression system of claim 1, wherein the sorbent comprises nanotubes.

18. The sorption compression system of claim 1, wherein the sorbent comprises an organometallic composite semiconductor material.

19. A sorption refrigeration system which comprises:
an enclosure which includes first and second spaced-apart electrical conductors;
a sorbent which is positioned in the enclosure between the first and second conductors;
a sorbate which is capable of combining with the sorbent in an adsorption reaction to form a sorbate/sorbent compound;
a power supply which is connected to the first and second conductors and which generates an electrical current that is conducted through the sorbate/sorbent compound to desorb the sorbate from the sorbent in a desorption reaction; and
an evaporator which is connected to the enclosure;
wherein sorbate which is discharged from the enclosure during the desorption reaction is evaporated in the evaporator and communicated back to the enclosure during the adsorption reaction to produce a cooling effect at the evaporator; and
wherein the desorption reaction is substantially non-thermal.

20. The sorption refrigeration system of claim 19, further comprising a controller for selectively activating the power supply to initiate and terminate each desorption reaction.

21. The sorption refrigeration system of claim 20, further comprising at least one valve for controlling the flow of sorbate between the enclosure and the evaporator.

22. The sorption refrigeration system of claim 21, wherein the valve is actuated by the controller.

23. The sorption refrigeration system of claim 19, wherein:
the enclosure includes an electrically conductive first member, an electrically conductive second member which is connected to the first member, and an electrical insulator which is positioned between the first and second members; and
the first and second conductors comprise the first and second members, respectively.

24. The sorption refrigeration system of claim 23, wherein:
the sorbent comprises first and second spaced-apart, generally parallel surfaces and a thickness which is transverse to the first and second surfaces; and
the thickness is less than the square root of the area of the first and second surfaces.

25. The sorption refrigeration system of claim 24, wherein the adsorption reaction produces a heat of adsorption which is conducted through the sorbent and the first and second members.

26. The sorption refrigeration system of claim 23, wherein the sorbent is attached to the first and/or the second member.

27. The sorption refrigeration system of claim 19, wherein the sorbate/sorbent compound comprises an impedance which is approximately the same as the impedance of the power supply.

28. The sorption refrigeration system of claim 19, wherein the sorbent comprises a carbon foam material.

29. The sorption refrigeration system of claim 19, wherein the sorbent comprises a graphitic foam material.

30. The sorption refrigeration system of claim 19, wherein the sorbent comprises nano-structured semiconductor material.

31. The sorption refrigeration system of claim 19, wherein the sorbent comprises fullerenes.

32. The sorption refrigeration system of claim 19, wherein the sorbent comprises nanotubes.

33. The sorption refrigeration system of claim 19, wherein the sorbent comprises an organometallic composite semiconductor material.

34. A method of cycling a sorbate between a low pressure state and a high pressure state which comprises:
positioning a sorbent in an enclosure between first and second electrical conductors;
adsorbing the sorbate onto the sorbent to form a sorbate/sorbent compound;
conducting an electrical current through the sorbate/sorbent compound to desorb the sorbate from the sorbent; and
repeating the adsorption and desorption steps to cycle the sorbate between a relatively low pressure state during the adsorption reaction and a relatively high pressure state during the desorption reaction;
wherein the desorption step is substantially non-thermal.

35. The method of claim 34, further comprising:
evaporating the sorbate subsequent to each desorption step to produce a cooling effect.

\* \* \* \* \*